United States Patent [19]

Geilinger et al.

[11] Patent Number: 4,955,285
[45] Date of Patent: Sep. 11, 1990

[54] SYSTEM FOR COVERING THE ENERGY REQUIREMENT OF A ROOM

[75] Inventors: Peter Geilinger, Winterthur; Bruno Keller, Zurich, both of Switzerland

[73] Assignee: Geilinger AG, Wiesendangen, Switzerland

[21] Appl. No.: 250,964

[22] Filed: Sep. 23, 1988

Related U.S. Application Data

[63] Continuation of Ser. No. 878,373 filed as PCT CH85/00143 on Oct. 1, 1985 published as WO86/02145 on Apr. 10, 1986 abandoned.

[30] Foreign Application Priority Data

Oct. 8, 1984 [EP] European Pat. Off. ......... 84810486.5

[51] Int. Cl.⁵ .............................................. F24F 3/02
[52] U.S. Cl. ..................................... 98/39.1; 98/34.6; 165/48.1; 165/54
[58] Field of Search ............... 98/316, 33.1, 34.6, 98/39.1, 40.07; 165/48.1, 54; 236/49; 237/46; 219/213, 347, 354, 361

[56] References Cited

U.S. PATENT DOCUMENTS

| | | | |
|---|---|---|---|
| 3,909,589 | 9/1975 | Stone et al. | 219/361 |
| 3,935,898 | 2/1976 | Westergren | 236/49 X |
| 4,300,441 | 11/1981 | Dicks | 98/40 C |
| 4,477,020 | 10/1984 | Makara | 237/46 X |
| 4,535,684 | 8/1985 | Perng | 98/33.1 X |
| 4,591,697 | 5/1986 | Lexer | 219/347 X |

FOREIGN PATENT DOCUMENTS

| | | |
|---|---|---|
| 117885 | 9/1984 | European Pat. Off. . |
| 2211634 | 12/1972 | Fed. Rep. of Germany ...... 219/213 |
| 2414722 | 10/1975 | Fed. Rep. of Germany ...... 219/213 |
| 2548775 | 5/1977 | Fed. Rep. of Germany . |
| 2940830 | 4/1981 | Fed. Rep. of Germany . |
| 3037092 | 6/1982 | Fed. Rep. of Germany . |
| 2529308 | 12/1983 | France ................................. 165/54 |
| 1429979 | 3/1976 | United Kingdom . |

OTHER PUBLICATIONS

Grafeling, "Sparsame Burobauten," Warme, vol. 88, No. 2, Apr. 1982, pp. 54, 56.
W. Germany, Patent Abstracts, R7726, V/36c, Runte, Sep. 1960, pp. 1–2.

Primary Examiner—Harold Joyce
Attorney, Agent, or Firm—Kenyon & Kenyon

[57] ABSTRACT

For lowering the energy requirement for a room (2) ventilated by a ventilating system (11 to 17) of a building (1), windows (4) and opaque wall parts of the outside wall (3) are designed so that the heat transfer numbers (kF and kW, respectively) are smaller than 1 W/m².K. In addition, the supply air flows into the room (2) near the floor (9) at the comfort temperature of at most 20° to 22° C. and an input velocity which does not exceed a maximum air velocity which is permissible for comfort conditions in an occupied zone.

10 Claims, 1 Drawing Sheet

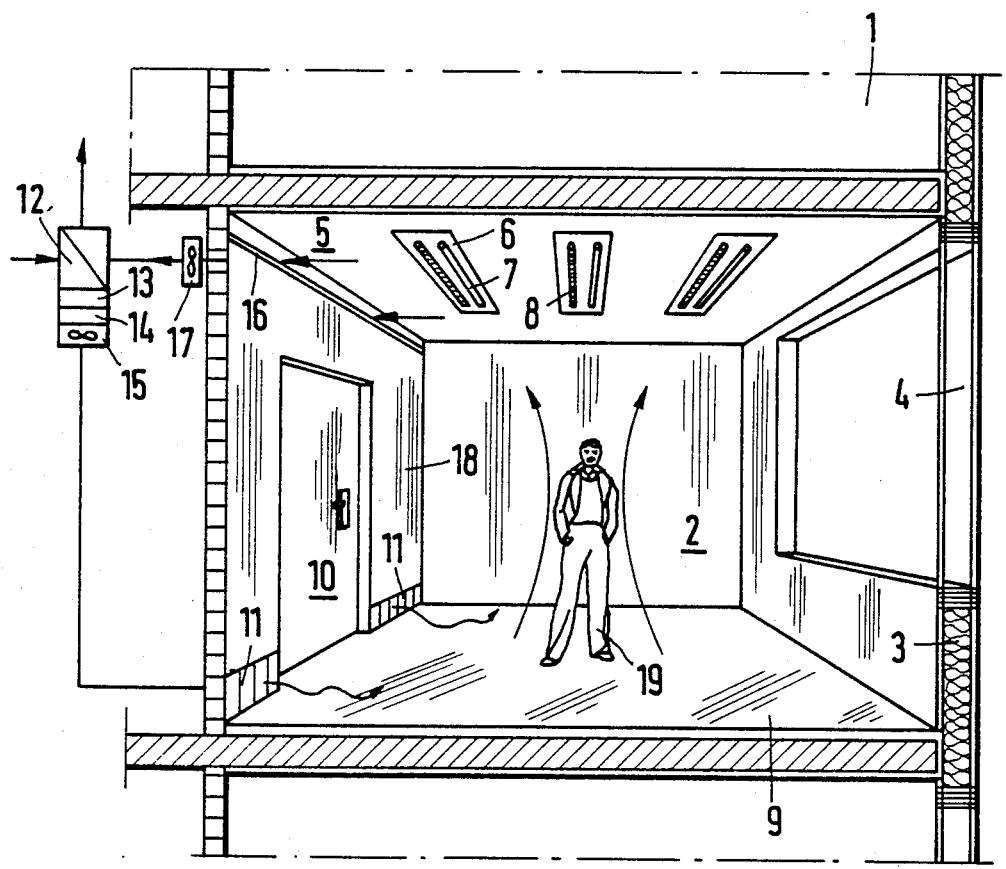

SYSTEM FOR COVERING THE ENERGY REQUIREMENT OF A ROOM

This application is a continuation of application Ser. No. 878,373, filed as PCT CH85/00143 on Oct. 1, 1985 published as WO86/02145 on Apr. 10, 1986, now abandoned.

The invention relates to a system for covering the energy requirement of a room in a building. More particularly, this invention relates to a system for ventilating a room having an outside wall including a window.

The outside walls of buildings consist in general partly of transparent structural parts, for instance, windows and partly of opaque wall parts, for instance, facade panels or masonry and the like; these parts mentioned exhibit considerable differences as to their heat retardation; for conventional windows, the heat transfer figures (k-values) are up to six times (1.0 to 2.8 W/m$^2$.K) the value for the opaque wall parts (0.3 to 0.5 W/m$^2$.K). Consequently, glass panels have a lower surface temperature on cold days than the other parts of the outside walls. This leads to a cold air drop in front of the window and to draft phenomena as well as to a unilateral radiation deficit for the occupants of the room. In order to assure the desired comfort for them, heaters such as radiators, convectors, supplemental floor heaters, etc. are arranged under the windows in order to compensate, the effects of the cold window surface, by the warmed-air curtain generated thereby.

However, several grave disadvantages are connected with these measures and arrangements:
- extensive and complicated installations are required with heater lines which must be brought up to the periphery of the building,
- the utilization of space in the vicinity of the windows is greatly limited due to the arrangement of heater installations,
- the temperature difference and the heat transfer at the window are increased by the warm-air curtain, which leads to increased energy losses at the window.

A system of the type mentioned at the outset is known from Swiss Pat. No. 555,519 or corresponding British Pat. No. 1,429,979. In this known system the supply air which is processed in a central air processing facility and consists of fresh air taken from the atmosphere and optionally mixed with ambient air, is blown into a room via an intermediate ceiling designed as a perforated ceiling and is distributed at least largely uniformly.

This supply air has a temperature which corresponds at most to a base or comfort temperature of 20 to 22° C.; if required the air serves, besides for air renewal and humidification, for cooling the room.

In order to compensate for the transmission losses to the outside during the cold season and for the cold-air drop in front of the window, radiators of a conventional heating system are placed in front of the windows as heat sources which cover the energy deficit of the room in winter time.

The discharge of the outgoing or exhaust air takes place immediately below the intermediate ceiling.

Because the supply air in this system serves to cover the cooling requirement and, in the instance, of very low outside temperatures possibly for the partial coverage of the heating requirements, large amounts of "power" must be transported with the supply air according to the large loads of present-day buildings by the windows, which requires large amounts of supply air and relatively many air changes per hour. The supply air blown in from above is mixed by induction and turbulence as completely as possible with the existing room air so that the comfort conditions, for instance, according to DIN German Standard No. 1946, are maintained in the area occupied by persons. Because the exhaust air is likewise discharged in the vicinity of the ceiling, the system works in short-circuit operation.

As mentioned, large numbers of air changes (3 to 8 air changes per hour) are required since the air of the room is exchanged only indirectly via induction and turbulence. In addition, the known system is relatively ineffective as seen from the point of view of air hygenics since the harmful substances (pollutants) which are generated in the room are first uniformly distributed before they are removed from the room; the removal of harmful substances is therefore based on the principle of dilution. This requires a relatively large share of fresh air in the supply air in order to keep the concentration of harmful substances low which results, particularly in winter operation, in a large energy requirement, changed only slightly by a sophisticated control which may, for instance, control CO2 or occupancy.

It is therefore an object of the invention to provide an improved building and ventilation system, especially with respect to the removal of harmful substances.

It is another object of the invention to considerably reduce the energy required for compensating for transmission losses in the heating and cooling operations of a room ventilation system.

It is another object of the invention to assure a high air quality with a relatively small fresh air content in the ventilation of a room of a building.

It is another object of the invention to provide for comfort in the ventilation of a room while reducing the number of air changes to as small a number as possible.

Briefly, the invention provides a building with at least one room with a floor and an outside wall including a window and an opaque wall part wherein the heat transfer figure (the overall k-value) of the entire window and the heat transfer number of the opaque wall parts each have a value of at most one W/m$^2$.K and that the air supply, distributed over at least one of the walls of the room, takes place in the vicinity of the floor, with the incoming velocity of the supply air into the room not exceeding a maximum value which corresponds to the comfort velocity in the zone occupied by persons.

The heat transfer figure of the entire window, the overall k-value, is composed of the two individual k-values for the glass panels and for the frame; the overall k-value can be determined here in its totality by experiment or can be calculated as the arithmetic mean from the individual k-values, where the latter enter into the calculation proportionally corresponding to the area shares of panel and frame.

During heating operation during the occupancy times, the transmission losses are covered by internal heat sources (people, illumination, apparatus and machinery) as well as by possible irradiation and thus the ventilating system is relieved of a heating function. Thus, the supply air can be fed-in, during a heating operation, at the comfort temperature; the air distribution and quantity can be chosen in view of optimum air-hygenics effect. Because of the small amount required, the supply air consists entirely or at least in an overwhelming part of atmospheric fresh air which flows in at a very low velocity and with correspondingly small numbers of air changes (n=0.5 to 1 per hour in heating operation). Thus, the harmful substances are pushed slowly toward the ceiling where they are removed. The natural thermal flow caused by people and apparatus has a positive effect here.

The system therefore operates in accordance with the principle of creating a thermally stable fresh-air "lake" or reservoir at the proper temperature with a comfort temperature of 20 to 22° C. near the floor. The thermal flow generated by people, machines and possible radiation then draws from the reservoir. Since the air impurities generated by humans are generally produced at a higher temperature, they travel upward with the thermal flow where they are drawn off as discharge or exhaust air. All internal heat sources as well as the incidence of radiation through windows contribute to the stabilization of the described air flow in that they increase the temperature difference between the upper and lower layers of air.

Without conventional supplemental heating in front of the windows, such a mode of operation is possible only because the internal sources and possible radiation are sufficient to relieve the supply air of a heating and energy transporting function, i.e., to cover the transmission losses. This is because of the small k-values, especially of the windows. For this purpose, the cold air drop at the outside wall, especially at the windows, must in the extreme case also be in the range of the comfort conditions. For instance, the temperature difference of the window against the room must not be greater than 3 to 4° C., because the window surface temperature, as the normally lowest surface temperature of the outside walls, must be so high that elevated air temperatures for compensating radiation losses of people are not necessary. These requirements are met by outside walls, having k-values smaller than 1 $W/m^2.K$.

The low k-values for the window can be achieved, for instance, by mutliple glass panes exceeding simple glass panels or by measures which are described in European Patent No. A-117,885. A further possibility is the use of highly heat-retarding and highly transparent materials, for instance, aerogelene between the panes. The k-values for the wall parts are maintained by means of known heat retarding measures and/or materials. If in special cases heat-retarding measures are required at the ceiling, the floor or inside walls, the k-values of these elements are, of course, adapted to those of the outside walls.

During times when the room is not occupied (night, weekends and holidays), the cooling rate is so small that heating can usually be dispensed with. A possibly occurring heating requirement can be covered by simple and inexpensive supplemental heating devices of low power, to maintain a desired room temperature. It has been found practical for this purpose if a supplemental electrical heating device is provided in the lighting fixtures. However, a device for circulating air may be useful for instance. The use of supplemental heaters is not limited by any comfort conditions, so that these heating devices can be kept very simple and can be employed in intermittent operation.

The "refrigeration" required for cooling operation is "supplied" in the system via the supply of fresh air in the manner known in the art; its temperature difference from the desired room temperature is, however, limited for reasons of comfort and should not exceed 10 to 12° C. For covering the refrigeration required, the number of air changes per hour (n/h) is increased, according to the requirements, up to the maximally permissible incoming velocity of the supply air. It is a decisive contributing factor to a small cooling power requirement, i.e., a relatively small heat production to be removed from the room with the supply air that the thermal loading of the room by the window is low because of the window's low k-value and a small total energy passage which is achieved optionally by means of additional sun protection measures. It is possible thereby to limit the number of air changes to maximally about n=3/h also in summertime and generally even below it; incoming velocities equal to or less than 20 cm/sec are required with reasonable dimensions of the air input cross section. Since the warm air to be removed rises because of the thermal flow, the known suction at the ceiling in conjunction with air input near the floor has been found particularly practical; thereby, the "short circuit operation" discussed in connection with the known arrangement, is avoided. In addition, an arrangement of the exhaust air opening in the vicinity of the outside wall for the window, respectively, has the effect that the warm air generated at the window can flow off directly.

The removal of the harmful substances, in summer as well in winter operation, takes place due to a steady flow upward and not because of gradual dilution.

Advantageously, the maximum supply temperature is 20 to 22° C. and the maximum input velocity is 0.2 m/sec and preferably 0.15 m/sec.

The supply quantity can be controlled in addition in various ways for the further saving of energy, for instance, to a constant-volume flow during the operation time;
with a variable volume flow, controlled by the $CO_2$ or moisture content of the exhaust air;
with variable volume flow controlled by the number of persons occupying the room;
with variable volume flow, controlled by the temperature of the exhaust air.

The invention will be explained in greater detail in the following, making reference to an embodiment example in conjunction with the blower.

The sole figure shows schematically a room in a building equipped in accordance with the invention, in a three-dimensional sketch.

As a portion of a larger building 1, the figure shows a room 2 which is surrounded on three sides and upward and downward by similar rooms or a hallway, which is not shown in detail. On the right-hand side, the room 2 is closed off by an outside wall 3, in which a window 4 is provided.

In the ceiling 5 of the room 2 there are radiation reflectors 6 which are spaced from each other and in each of which a fluorescent tube is installed as a lighting fixture 7 and a commercially available heating rod, for instance, of ceramic as a heater 8. Each reflector 6 and each radiator 7 or 8 therein can be switched on or off manually individually and separately.

The lighting fixture 7 and the heater 8 are chosen so that the power taken by them is the same. It is, for instance, 25 $W/m^2$ of room surface. The power consumption in the individual reflectors 6 can be likewise equal or also different.

Furthermore, the lighting and heating fixture 7 and 8 of a reflector 6 are coupled, in the simplest case via a double-throw switch (not shown) which can be operated by hand, to each other in an electric circuit in such a manner that in a reflector 6, only the one or the other of the two energy-emitting radiators 7 and 8 can be in operation selectably.

The room 2 also has a floor 9 and a wall 18 equipped with a door 10 of a width of 1 meter as well as an inlet grille 11 to a chamber of a ventilating system which are only indicated schematically. The ventilation system is equipped with a central air processing facility, of which only a heat exchanger 12 for heat recovery from the exhaust air of the room 2, a preferably electrically heated air heater 13 and an air cooler 14 as well as a conveyor device for the supply air, e.g. a blower 15, are shown. The blower 15 draws in fresh air which, after filtering, may optionally be heated or cooled before flowing toward the inlet grille 11; the fresh air is heated here at least partially by heat recovered from the inlet air in the heat exchanger 12.

The inlet grille 11 which is subdivided by the door 10, into two grille sections extends, over the entire width of the room 2 which is 5 m wide, 4 m deep and 3 m high. The grill 11 is backed by a filter cloth or a fine-mesh metal screen, (not shown), so that its flow resistance is considerably greater than that in the feedline. Therefore, a static air pressure builds up upstream of the inlet grille 11 which assures uniform distribution of the supply air flowing into the room 2 via the entire width of the grille 11.

Slightly below the ceiling 5 are arranged an exhaust air slot or outlet 16 extending over the entire width or several openings through which the spent exhaust air loaded with harmful substances and possibly excess heat is drawn off by an exhaust air fan 17 and is fed to the heat exchanger 12 as a medium giving off heat. The exhaust air, if necessary, gives off heat to the inflowing fresh air in the heat exchanger 12 before being discharged from the building 1. Advantageously, the exhaust air slot 16 can also be located above the window 4 in the region of the outside wall 3.

The air flow "driven" in the room 2 by human heat flow, symbolized by a standing person 19 is indicated by arrows.

SAMPLE CALCULATION

From the mentioned dimensions, the volume V of the room 2 is found to be 60 m$^3$; and the outside wall area is 15 m$^2$ of which 10 m2 are window and 5 m2 are window railings. The window 4 has dual glass panes and the heat transfer value is lowered by stretching transparent coated plastic foils between the panes to approximately 0.7 W/m$^2$.K, while that of the opaque parts of the outside wall 3 is 0.5 W/m$^2$.K.

From this are obtained in winter, transmission losses for the window 4 of 7 W/K, and for the window railing, 2.5 W/K, making a total of 9.5 W/K. From this is calculated, for a design temperature of $-10°$ C. and a comfort value for the room temperature of $+22°$ C., a power loss by transmission of maximally 304 W.

The lighting fixture and heating power installed in the room 2 or otherwise is 500 W, so that the transmission losses can be covered amply.

In addition, a human being supplies approximately 80 W if present; without incident daylight, the lighting must be switched on so that the heat produced in the room 2 is 580 W, whereby a considerable overheating of the discharge air is obtained which makes it possible to heat fresh air by means of heat recovery. During times of occupancy and with an average energy transmission for the incidence of radiation and an average energy transmission for the radiation of $g=0.32$ into the room 2 through the window 4, a radiation intensity of 70 W per m$^2$ is already sufficient to cover the transmission losses. This corresponds to the radiation of a heavily covered sky when additionally, parts of the lighting must be switched on anyhow.

Assuming that $\frac{2}{3}$ of the width of the discharge grille 11 consists of net slot widths, and the height h$_S$ of the slots is 0.1 m, the flow cross section available for blowing-in the supply air is A=2667 cm$^2$. For sufficient removal of the harmful substances, approximately n=0.5 to 1 per hour air changes are required in winter. From this, the fresh air supply to the room 2 requires air quantities of 8333 to 16,667 cm$^3$/sec for which purposes, with the assumed discharge grille, flow velocities of 3.1 to 6.3 cm/sec are required. These velocities are far below the maximum air input velocity permissible under the comfort conditions.

For heating up the fresh air, an additional power of 112 W is required with a heat recovery of 65%, starting from a design temperature of $-10°$ C. and a change of air of n=0.5/h, which may possibly be supplied by preheating the fresh air.

During shutdown times, the same transmission losses accumulate, and for possible leaks, an air change number of n=0.1/h will be assumed; thus losses of about 368 W are obtained which can be furnished without problem by the installed heating rods 8. These rods 8 can be used in intermittent operation, all or only part thereof, for instance, by a timer or by a room thermostat as a function of the temperature. In connection with covering the energy losses during the shutdown times it should further be mentioned that during longer interruptions of operation noticeable radiation can be expected during the day which provide an additional contribution for covering the losses by means of the storage capacity of the building.

In cooling or summer operation, the blowing-in velocity of the supply air into the room 2 can be increased to v=20 cm/sec without having to expect drafts and thereby loss of comfort. In addition, the velocity of the supply air drops relatively fast due to the mixing with the room air; and the air movements in the room are determined predominantly by the thermal conditions.

Also in this case, the low k-value of the window 4 and its relatively small difference from that of the remaining outside wall 3 is found helpful. Especially in conjunction with further known sun protection measures, for instance, sun curtains or blinds and/or reflecting coatings on the panes of the window 4, the window 4 and the outside wall 3, respectively, do not form the dominant "heat source" during cooling operation and also do not influence the air flow in the room 2 too much. In this manner the permissible input velocities of the cooled supply air, the temperature of which may be up to 12 ° C. below the desired room temperature, are sufficient for the removal of the heat which exceeds the comfort conditions which, as is well known, permit a room temperature up to 6° C. below the outside temperature.

If one takes as the basis the already mentioned limits for the air input velocity and the temperature of the cooled supply air, the supply air flow is larger than 53,000 cm$^3$/sec; from this quantity of air. A number of air changes n=3/h is calculated for the room 2. With a temperature difference of 12° C. between the supply air and the room air, 640 W of excess heat can thus be removed.

We claim:

1. The combination of
    a building having at least one room with a floor and an outside wall including a window having a heat transfer number of at most 1 W/m² K and an opaque wall part having a heat transfer number of at most 1 W/m² K; and
    a ventilating system for feeding air into said room over a width of at least one wall of said room and adjacent said floor, said ventilating system including a blower for blowing the air into said room at a velocity below a predetermined comfort velocity for an occupant in said room.

2. The combination as set forth in claim 1 wherein said blower blows air into said room at a maximum velocity of 0.2 meters per second.

3. The combination as set forth in claim 1 wherein said ventilating system includes an exhaust air opening adjacent a ceiling of said room for exhausting air from said room, said opening extending over at least 80% of the width of said outside wall.

4. The combination as set forth in claim 1 wherein said ventilating system includes a grille adjacent to said floor for blowing a supply of air from said blower across said floor and an exhaust air opening adjacent a ceiling of said room for exhausting air from said room.

5. The combination as set forth in claim 4 wherein said ventilating system includes a heat exchanger for receiving and exchanging heat between a flow of exhaust air from said exhaust air opening and a flow of supply air to said grille.

6. The combination as set forth in claim 5 wherein said ventilating system includes a heater for heating the flow of supply air to said grille to a comfort temperature of at most from 20° C. to 22° C.

7. The combination as set forth in claim 1 which further comprises at least one electric lighting fixture in said room for providing artificial light.

8. The combination of a building having at least one room with a floor and an outside wall including a window having a heat transfer number of at most 1 W/m²K and an opaque wall part having a heat transfer number of at most 1 W/m²K; and
    a ventilating system for feeding air into said room at a maximum velocity of 0.2 meters per second over a width of at least one wall of said room and adjacent said floor.

9. The combination as set forth in claim 8 wherein said ventilating system includes a grille adjacent said floor, a blower for blowing a supply of air through said grille and across said floor and an exhaust air opening adjacent a ceiling of said room for exhausting air from said room.

10. The combination as set forth in claim 9 wherein said ventilating system includes a heat exchanger for receiving and exchanging heat between a flow of exhaust air from said exhaust air opening and a flow of supply air to said grille.

* * * * *

UNITED STATES PATENT AND TRADEMARK OFFICE
CERTIFICATE OF CORRECTION

PATENT NO.   : 4,955,285

DATED        : September 11, 1990

INVENTOR(S)  : PETER GEILINGER

It is certified that error appears in the above-identified patent and that said Letters Patent is hereby corrected as shown below:

Column 5, line 15 change "inlet" to -exhaust-

Signed and Sealed this

Twenty-sixth Day of May, 1992

Attest:

DOUGLAS B. COMER

*Attesting Officer*  *Acting Commissioner of Patents and Trademarks*